United States Patent
Bayerle et al.

(10) Patent No.: US 6,684,629 B2
(45) Date of Patent: Feb. 3, 2004

(54) METHOD FOR CHECKING THE CONVERSION CAPACITY OF A CATALYTIC ELEMENT FOR CONVERTING OZONE

(75) Inventors: Klaus Bayerle, Obertraubling (DE); Frank Hacker, Regensberg (DE); Hong Zhang, Tegernheim (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/262,241

(22) Filed: Oct. 1, 2002

(65) Prior Publication Data

US 2003/0093990 A1 May 22, 2003

(30) Foreign Application Priority Data

Oct. 2, 2001 (DE) .......................................... 101 48 606

(51) Int. Cl.[7] ................................................. F01N 3/00
(52) U.S. Cl. .............................. 60/277; 60/274; 60/276; 123/536; 423/219; 423/243.3; 422/168; 73/31.01; 73/118.1
(58) Field of Search .......................... 60/277, 274, 276, 60/286, 298, 299, 300, 307; 123/41.43, 41.44, 536; 423/219, 245.1, 243.3, 247; 422/168, 173; 73/1.06, 31.01, 118.1

(56) References Cited

U.S. PATENT DOCUMENTS

| | | | |
|---|---|---|---|
| 5,954,040 A | | 9/1999 | Riedel |
| 5,997,831 A | * | 12/1999 | Dettling et al. ............. 423/219 |
| 6,087,929 A | | 7/2000 | Charzinski et al. |
| 6,190,627 B1 | * | 2/2001 | Hoke et al. .................. 423/219 |
| 6,200,542 B1 | * | 3/2001 | Poles et al. .................. 423/210 |
| 6,212,882 B1 | * | 4/2001 | Greger et al. ................. 60/274 |
| 6,212,883 B1 | * | 4/2001 | Kang ........................... 60/275 |
| 6,543,217 B2 | * | 4/2003 | Alleving et al. .............. 60/277 |

FOREIGN PATENT DOCUMENTS

| | | | |
|---|---|---|---|
| DE | 39 38 592 A1 | 11/1989 | .......... B01D/53/34 |
| DE | 196 21 941 C2 | 5/1996 | ............. G09G/3/00 |
| DE | 19722 333 A1 | 5/1997 | ............ F02D/41/02 |

OTHER PUBLICATIONS

SAE Paper 2001–01–1302 PremAir®Catalyst System–OBD Concepts, Ronald M. Heck, Fred M. Allen, Jeffrey B. Hoke and Xiaolin Yang; Engelhard Corporation.

* cited by examiner

*Primary Examiner*—Binh Tran
(74) *Attorney, Agent, or Firm*—David M. Thimmig; Mayer, Brown, Rowe & Maw LLP

(57) ABSTRACT

Method for checking the conversion capacity of a catalytic element for converting ozone where the catalytic element is provided as a vehicle radiator with a catalytic coating and the method of checking uses ozone sensors upstream and downstream of the radiator. The check is only carried out if predetermined enable conditions are satisfied. Only then are the values emitted by the sensors recorded and compared with one another. A variable which represents an uncorrected value for the quality of the conversion capacity is derived from this comparison. This variable is weighted as a function of at least one operating parameter of the vehicle. The weighted variable is compared with a predetermined threshold value, and, if the threshold value is exceeded, it is concluded that the conversion capacity of the radiator is insufficient.

12 Claims, 2 Drawing Sheets

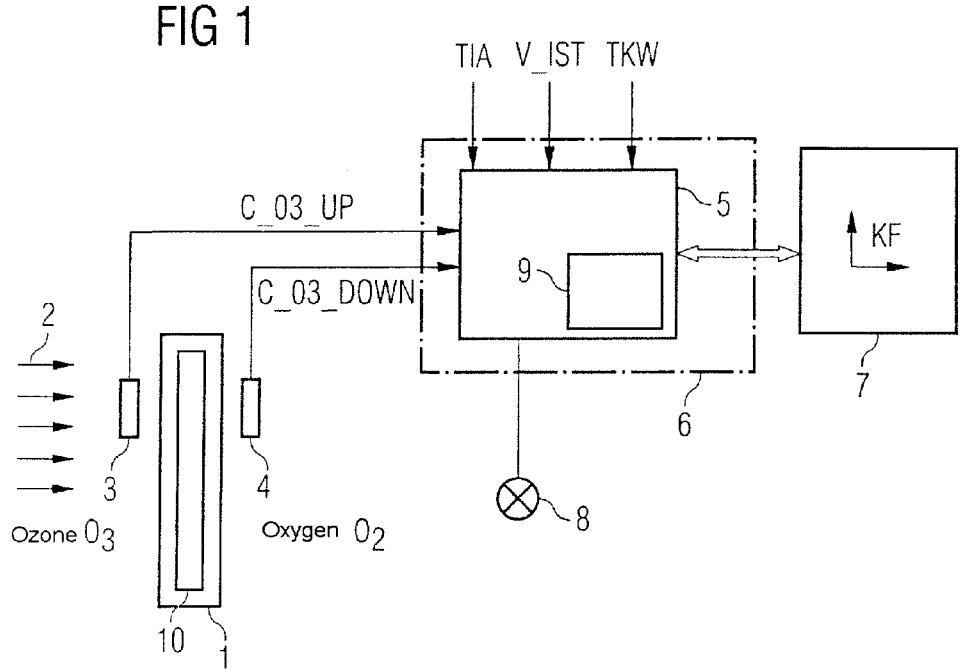

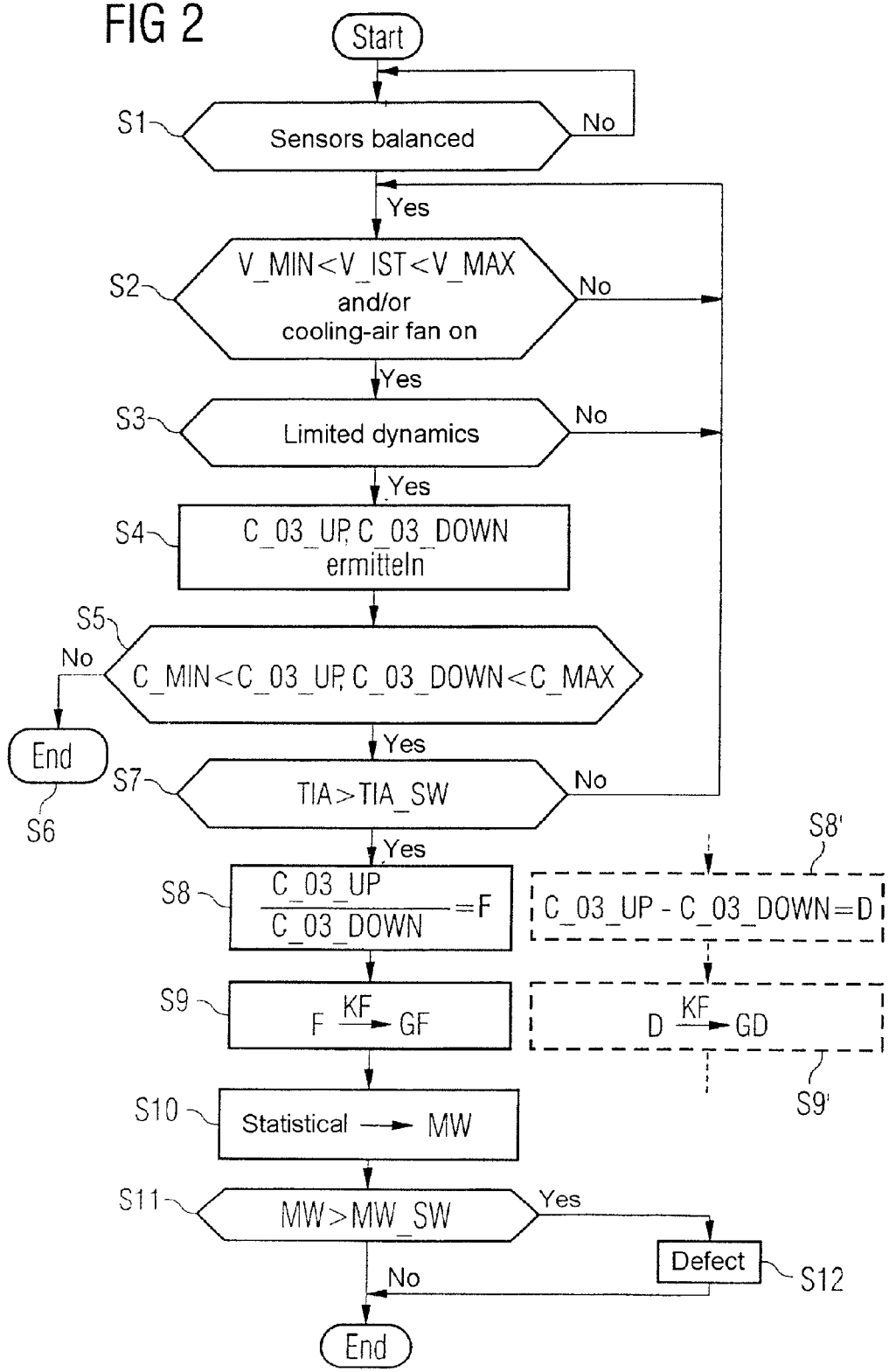

METHOD FOR CHECKING THE CONVERSION CAPACITY OF A CATALYTIC ELEMENT FOR CONVERTING OZONE

BACKGROUND OF THE INVENTION

The invention relates to a method for checking the conversion capacity of a catalytic element for clearing ozone which is present in a vehicle.

For reasons of environmental and personal protection, the levels of pollutants which result from vehicles with an internal combustion engine or from the generation of energy using stationary combustion installations need to be significantly reduced.

A novel approach to reducing the levels of pollutants consists in actively removing pollutants not directly from the exhaust-gas stream from an internal combustion engine or a stationary combustion installation, but rather from the ambient air. This route is promising in particular for the removal of ground-level ozone, which has a considerable influence on the well-being of people on account of its strongly oxidizing action. Ozone itself is not a gas which is emitted directly and therefore cannot be removed in the exhaust-gas stream. It is formed when nitrogen oxides are present in outside air under solar radiation, on account of the UV component of this radiation, through complex photochemical reaction equilibria.

Since ozone is extremely reactive, it can easily be broken down quantitatively by means of a catalyst system through which air flows. These catalysts are extremely stable, since there is no need for any direct action of strong oxidation catalysts, which are highly sensitive to poisoning, such as for example platinum. Systems which substantially effect adsorption of the ozone on a surface are sufficient; this ozone then breaks down instantaneously to form oxygen.

Catalyst systems of this type have long been in use in passenger aircraft which fly close to the ozone layer, where they are used to treat the air which is passed into the passenger compartment. Recently, such systems have also been deployed in motor vehicles. Here, the radiator of the vehicle is coated with the catalyst. The large quantities of air flowing through the radiator are quantitatively cleaned of ozone, i.e. the vehicle cleans the ambient air.

When ozone catalyst systems of this type are used, the American environmental agency CARB (California Air Resources Board) grants automobile manufacturers a bonus (credits) with regard to the exhaust-gas limits for the LEV (Low Emission Vehicle) exhaust legislation. However, the credits are only granted if there is on-board diagnosis of the ozone catalyst system.

A system of this type is described in SAE Paper 2001-01-1302"PremAir® Catalyst System—OBD Concepts", Ronald M. Heck, Fred M. Allen, Jeffrey B. Hoke and Xiaolin Yang; Engelhard Corporation.

The invention is based on the object of providing a method for checking a catalyst which is used for ozone conversion in a vehicle. The object is achieved in accordance with the features of the invention in the patent claims.

SUMMARY OF THE INVENTION

The method according to the invention is distinguished by the fact that, to check the conversion capacity of a catalytic element for cleaving ozone, which is arranged in a vehicle and is exposed to an ambient-air stream, a first ozone sensor is arranged upstream of the catalytic element in the ambient-air stream, in order to record the ozone concentration prevailing at that location, and a second ozone sensor is arranged downstream of the catalytic element in the ambient-air stream, in order to record the ozone concentration prevailing at that location. The check is only carried out if predetermined enable conditions are satisfied. Only in this case are the values emitted by the sensors recorded and compared with one another. A variable which represents an uncorrected value for the quality of the conversion capacity is derived from this comparison. Then, this variable is weighted as a function of at least one operating parameter of the vehicle. The weighted variable is compared with a predetermined threshold value and, if the threshold value is exceeded, it is concluded that the conversion capacity of the catalytic element is insufficient.

BRIEF DESCRIPTION OF THE DRAWINGS

The invention is explained in more detail below with reference to an exemplary embodiment and with the aid of figures, in which:

FIG. 1 shows an outline illustration of the way in which the conversion capacity of a radiator of a vehicle which is coated with a catalytic element can be checked.

FIG. 2 shows a flow diagram showing how the conversion capacity of a radiator of a vehicle which is coated with a catalytic element can be checked.

DETAILED DESCRIPTION OF THE PREFERRED EMBODIMENT

In the illustration shown in FIG. 1, an ambient-air stream 2 flows to a radiator 1 of a vehicle. The incoming flow takes place as a result of the vehicle speed, by means of the air stream and/or by means of a fan. The radiator 1 is coated with a catalytic element 10 for breaking down ozone, referred to below as an ozone catalyst. Upstream of the radiator 1 there is a first sensor 3 for determining the ozone concentration in the ambient air upstream of the radiator 1. The signal of the sensor 3 is denoted by C_O3_UP. Downstream of the radiator 1 there is a second sensor 4 for determining the ozone concentration in the ambient air downstream of the radiator 1. The signal from the sensor 4 is denoted by C_O3_DOWN.

Both sensors 3, 4 are connected to a control and evaluation device 5 which evaluates the measured values C_O3_UP, C_O3_DOWN from the two sensors 3, 4. This device 5 is preferably designed as a microprocessor. The control and evaluation device 5 may also be integrated in an engine management system 6 which controls operation of the internal combustion engine of the vehicle, as indicated by dashed lines in FIG. 1. Further operating variables of the internal combustion engine and environmental parameters, in particular the actual value of the vehicle speed V_IST, the coolant temperature TKW of the internal combustion engine which drives the vehicle, and the ambient air temperature TIA, are fed to the control and evaluation device 5.

The control and evaluation device 5 has a fault memory 9, in which the results of the checking of the conversion capacity of the ozone catalyst are stored.

Furthermore, the control and evaluation device 5 is connected to a memory device 7, in which various characteristic diagrams KF, the significance of which is explained below, are stored.

Moreover, the control and evaluation device 5 controls a display means 8, which indicates to the driver of the vehicle whether the ozone conversion is functioning correctly. By way of example, a warning light can illuminate at a conversion rate which lies below a predetermined level. It is also conceivable for the current conversion rate to be displayed continuously.

The flow diagram illustrated in FIG. 2 shows the checking routine for the ozone catalyst.

After the diagnosis has started, in a first method step S1 it is checked whether the balancing of the two ozone sensors 3, 4 has ended. Since two sensors, the properties of which are only identical in an ideal scenario, are used for the diagnosis, it is necessary to reckon with inaccuracy in the determination of the ozone concentration on account of the sensor specification and sensor aging. To minimize this influence and therefore to allow reliable diagnosis of the ozone conversion, the sensors are balanced using any known method or are plausibility-checked with regard to their output signals.

If the balancing of the two ozone sensors 3, 4 has not yet ended, the diagram branches back to method step S1 (waiting loop).

On the other hand, if the balancing of the two ozone sensors 3, 4 has ended, in method step S2 it is checked whether there is a flow through the radiator 1 which has a catalytic action for ozone which is suitable for diagnosis. It is concluded that there is a flow through the radiator 1 if the vehicle speed V_IST lies within a range which is predetermined by the limits V_MIN and V_MAX or if the cooling-air fan of the radiator 1 is switched on when the vehicle is stationary. The two limit values V_MIN and V_MAX are determined experimentally as a function of the geometry, the surface area exposed to incoming flow and the installation location of the radiator 1, and also as a function of the sensors 3, 4 used and of the sensor arrangement. A typical value for V_MIN is 30 km/h and a typical value for V_MAX is 80 km/h.

If the determined speed V_IST of the vehicle lies outside the predetermined limits, the method branches back to method step S2, and otherwise it is checked, in a method step S3, whether the conditions for limited dynamics are satisfied, i.e. there are no major load changes in the internal combustion engine.

If the conditions for limited dynamics are not present, the method once again branches back to method step S2.

In a method step S4, the current values C_O3_UP and C_O3_DOWN from the two sensors 3, 4 are read by the control and evaluation device 5, and in method step S5 each value is independently compared with a lower threshold value C_MIN and an upper threshold value C_MAX. These threshold values depend on the type of sensors used, in particular on the nominal characteristic curve of the sensors. This means that useful diagnosis of the ozone conversion is not possible if the determined values C_O3_UP and C_O3_DOWN lie outside the specified characteristic curves of the sensors. A typical value for C_MIN is 100 ppb (parts per billion) and a typical value for C_MAX is 1000 ppb. Therefore, the method is interrupted if one of the two values C_O3_UP and C_O3_DOWN lies outside this range (method step S6).

If both values C_O3_UP and C_O3_DOWN lie within said range, in a method step S7 it is checked whether the intake air temperature TIA is greater than a predetermined threshold value TIA_SW. If not, the method branches back to method step S2, but otherwise the method continues to method step S8.

In method step S8, the ratio between the two values C_O3_UP, C_O3_DOWN is formed, and the quotient F obtained is stored.

In method step S9, this quotient F is weighted as a function of at least one of the parameters coolant temperature TKW, intake air temperature TIA, vehicle speed V_IST, setting of the cooling-air fan. For this purpose, a plurality of characteristic diagrams KF are provided in the memory device 7, from which diagrams a weighted quotient GF is read as a function of the quotient F as input variable for these characteristic diagrams KF.

To rule out incorrect decisions during the checking of the conversion capacity of the ozone catalyst, for example as a result of individual freak values or unreproducible influences, the values GF from method step S9 are fed to a statistical evaluation. An example of a possible evaluation consists in the values obtained from a plurality of check routines being added up over a defined period and this cumulative value being divided by the number of diagnoses. However, it can also be carried out by means of a sliding formation of a mean. The mean MW obtained in this way in method step S10 is then compared with a predetermined threshold value MW_SW (method step S11). By way of example, the threshold value MW_SW may be set in such a way that a reduction in the conversion capacity of the ozone catalyst to 50% compared to the conversion capacity of a new ozone catalyst is classified as being a failure.

If the mean MW is below the threshold value MW_SW, the ozone catalyst conversion is sufficient and the method is at an end. However, if the threshold value MW_SW is exceeded, it is concluded that the ozone catalyst 1 is defective, and a suitable entry to the defect memory 9 is made in method step S12. In addition, the failure of the conversion capacity can be optically and/or acoustically communicated to the driver of the vehicle by means of the display device 8.

As an alternative to forming a ratio of the values C_O3_UP, C_O3_DOWN in method step S8, it is also possible to form the difference D between the two values and to weight this difference D. This alternative is illustrated by dashed lines indicating method steps S8' and S9' in FIG. 2. The remainder of the evaluation takes place in a similar manner to the method steps described, with the exception that a different threshold value is selected in method step 11.

What is claimed is:

1. A method for checking the conversion capacity of a catalytic element for cleaving ozone, which is arranged in a vehicle and is exposed to an ambient-air stream, a first ozone sensor being arranged upstream of the catalytic element in the ambient-air stream to record upstream ozone concentrations, and a second ozone sensor being arranged downstream of the catalytic element in the ambient-air stream to record downstream ozone concentrations, the method comprising the steps of:

evaluating predetermined enable conditions necessary for the checking to proceed, if the enable conditions are satisfied, recording the values emitted by the first and second ozone sensors, comparing the values emitted by the first and second ozone sensors with one another and determining a variable which represents an uncorrected value for the quality of the conversion capacity where the variable is weighted as a function of at least one operating parameter of the vehicle, comparing the weighted variable with a predetermined threshold value and, if the threshold value is exceeded, concluding that the conversion capacity of the catalytic element is insufficient.

2. The method as claimed in claim 1, wherein the step of evaluating the enable conditions further comprises checking whether the first and second ozone sensors have been balanced.

3. The method as claimed in claim 1, wherein the step of evaluating the enable conditions further comprises checking whether speed of the vehicle lies within a range defined by a lower limit and an upper limit.

4. The method as claimed in claim 1, wherein the step of evaluating the enable conditions further comprises checking whether a limited dynamics requirement is satisfied.

5. The method as claimed in claim 1, wherein the step of evaluating the enable conditions further comprises checking whether intake-air temperature is above a predetermined threshold value.

6. The method as claimed in claim 1, further comprising the steps of forming a ratio from the values emitted by the first and second ozone sensors to obtain a variable, and weighting the variable obtained.

7. The method as claimed in claim 1, further comprising the step of calculating the difference in the values emitted by the first and second ozone sensors to obtain a variable, and weighting the variable obtained.

8. The method as claimed in claim 1, further comprising the steps of calculating a mean from weighted variables obtained from a plurality of check routines, and comparing the mean obtained in this way with the threshold value.

9. The method as claimed in claim 1, wherein the operating parameter is coolant temperature.

10. The method as claimed in claim 1, wherein the operating parameter is intake air temperature.

11. The method as claimed in claim 1, wherein the operating parameter is speed of the vehicle.

12. The method as claimed in claim 1, wherein the operating parameter is a fan setting.

* * * * *